(12) United States Patent
Heckmann et al.

(10) Patent No.: US 7,061,781 B2
(45) Date of Patent: Jun. 13, 2006

(54) CIRCUIT ARRANGEMENT FOR OPERATING LIGHT SOURCES

(75) Inventors: Markus Heckmann, Münich (DE); Harald Schmitt, Münich (DE)

(73) Assignee: Patent Treuhand Gesellschaft fur elektrische Gluhlampen mbH, Munich (DE)

( * ) Notice: Subject to any disclaimer, the term of this patent is extended or adjusted under 35 U.S.C. 154(b) by 17 days.

(21) Appl. No.: 11/030,189

(22) Filed: Jan. 7, 2005

(65) Prior Publication Data

US 2005/0152163 A1 Jul. 14, 2005

(30) Foreign Application Priority Data

Jan. 9, 2004 (DE) .................... 10 2004 001 618

(51) Int. Cl.
*H02M 5/42* (2006.01)
*H01B 37/02* (2006.01)

(52) U.S. Cl. .................. 363/81; 363/126; 315/224; 315/308

(58) Field of Classification Search ............. 363/37, 363/86, 88, 90, 126, 81; 315/307, 308, 224, 315/247
See application file for complete search history.

(56) References Cited

U.S. PATENT DOCUMENTS

| | | | |
|---|---|---|---|
| 4,949,013 A | | 8/1990 | Zuchtriegel |
| 5,828,562 A | * | 10/1998 | Rivet ...................... 363/125 |
| 5,982,649 A | * | 11/1999 | Turner ...................... 363/89 |
| 6,316,883 B1 | | 11/2001 | Cho et al. |
| 6,909,622 B1 | * | 6/2005 | Weng ...................... 363/126 |
| 2002/0122325 A1 | * | 9/2002 | Francescutti et al. ......... 363/81 |
| 2005/0151481 A1 | * | 7/2005 | Hoo et al. .................. 315/224 |

FOREIGN PATENT DOCUMENTS

| | | |
|---|---|---|
| WO | 90/09087 | 8/1990 |
| WO | 02/47441 | 6/2002 |

OTHER PUBLICATIONS (i) M. Dalla Costa, et al., "An Analysis About Valley Fill Filters Applied to Electronic Ballasts," Proceedings of the 29th Annual Conference of the IEEE Industrial Electronics Society, Roanoke, VA, Nov. 2003, pp. 509-514.
(ii) copy of Search Report from European Patent Office (for related foreign application) referencing the above-listed patent documents, dated Dec. 22, 2005 (3 pages total).

* cited by examiner

*Primary Examiner*—Jessica Han

(57) ABSTRACT

In a circuit arrangement for operating light sources, inexpensive technologies for power factor correction can be used in combination. A resonant capacitor in a reactance network for coupling the light source is of dual design (C51, C52). A degree of freedom is thus produced which makes it possible to optimize the costs of the circuit arrangement.

9 Claims, 4 Drawing Sheets

CIRCUIT ARRANGEMENT FOR OPERATING LIGHT SOURCES

FIELD OF THE INVENTION

The invention relates to circuit arrangements for operating light sources. The invention relates in particular to circuit arrangements for supplying power to light sources from a supply system which are suitable for correcting a system-side power factor. The abbreviation PFC will be used below for the term power factor correction.

A feed system voltage has a system frequency. The term "radiofrequency" will be used below for frequencies which are substantially higher than the system frequency.

BACKGROUND OF THE INVENTION

The document WO 02/47441 (Hu) discloses an above-mentioned circuit arrangement. In this document, two PFC technologies are disclosed: a charge pump (referred to as "single feedback" in the document WO 02/47441 (Hu)) and a so-called valley fill circuit (referred to as "double pump" in the document WO 02/47441 (Hu)). Here, the charge pump is connected upstream of the valley fill circuit, when seen from the system voltage. In addition, the charge pump and the valley fill circuit are supplied by the same radiofrequency voltage source.

Charge pumps are known, for example, from the document U.S. Pat. No. 4,949,013 (Zuchtriegel). The essential feature of a charge pump is the connection of a rectifier output to a pump diode. A radiofrequency voltage which is drawn from a load circuit is applied to the connection point formed. At this point it should be emphasized that only one rectifier output is connected to a pump diode, for which reason this part of the circuit arrangement is referred to as "single feedback" in WO 02/47441 (Hu).

Valley fill circuits are known, for example, from the document WO 90/09087 (Skalak). Of concern here is a passive PFC circuit comprising two storage capacitors and three diodes which is connected between two rectifier outputs. The operation of the valley fill circuit is based on the fact that the storage capacitors are connected via the diodes such that they are charged by a system voltage as a series circuit but are discharged by a load as a parallel circuit.

A valley fill circuit may also act, to a limited extent, as a charge pump by one of its diodes being split into two diodes. For this purpose, a radiofrequency AC voltage needs to be applied to the connection point between the two diodes resulting from the splitting. The document U.S. Pat. No. 6,316,883 (Cho) describes a valley fill circuit which has been modified in this manner. The operating device described there for discharge lamps in addition also has a separate charge pump. This charge pump is connected downstream of the valley fill circuit when seen from the system-voltage side, as a result of which a further storage capacitor is required.

In WO 02/47441 (Hu), the charge pump is connected upstream of the valley fill circuit. A further storage capacitor is thus not required. The radiofrequency AC voltage, which is supplied to the charge pump, is derived from the radiofrequency AC voltage which is fed to the modified valley fill circuit.

It can be understood from the document WO 02/47441 (Hu) that the circuit arrangement described there achieves good values for the power factor. Standards such as IEC 61000-3-2, however, prescribe in addition limit values for rated current harmonics. Here, a distinction is drawn between light sources which draw up to 25 W from the system voltage and light sources which draw more than 25 W. Above 25 W the specifications are substantially higher, i.e. the amplitudes of the rated current harmonics need to be substantially lower.

One subject matter of the document WO 02/47441 (Hu) is a compact fluorescent lamp having an integrated operating device. Such lamps are customary on the market up to a power consumption from the power supply system of 25 W. Since up to 25 W the specifications in relevant standards for the rated current harmonics are low, the circuit arrangement disclosed in WO 02/47441 (Hu) can provide fluorescent lamp operation which conforms to standards up to 25 W.

There are many specifications for a circuit arrangement for operating light sources. The following specifications should be taken into consideration when designing these circuit arrangements:

- low system-side power factor
- low total harmonic distortion (THD) of the current drawn from the power supply system
- rated current harmonics which conform to standards
- high efficiency
- low crest factor of the current through the light source
- low radio interference
- low costs
- small geometric dimensions In order to operate fluorescent lamps at a power consumption from the power supply system of up to 25 W, the circuit arrangement disclosed in WO 02/47441 (Hu) is a good compromise for meeting the above-mentioned specifications. Above 25 W, however, it becomes problematic to conform to the relevant standards as regards rated current harmonics. In particular for fluorescent lamps, the crest factor of the lamp current is limited by standards (for example IEC 60929) to a maximum value of 1.7. It is also problematic to maintain this limit value given a power consumption from the power supply system of over 25 W.

Dimensioning the circuit arrangement disclosed in WO 02/47441 (Hu) such that the standards as regards the rated current harmonics are adhered to even at a power consumption from the power supply system of over 25 W means that there is a considerably increased load on components in the circuit arrangement. This results in an increase in the costs, in greater geometric dimensions and in reduced efficiency. If it is necessary also to adhere to the limit value for the crest factor of the lamp current according to IEC 60929, the components will be subject to an even greater load.

SUMMARY OF THE INVENTION

The object of the present invention is to develop a circuit arrangement for operating light sources based on the topology of a circuit arrangement according to WO 02/47441 (Hu) such that even at a power consumption from the power supply system of over 25 W, the rated current harmonics have values which conform to standards. For fluorescent lamp operation it is also the object of the present invention to make possible a lamp current crest factor which conforms to standards.

This object is achieved by a circuit arrangement for operating light sources which has, in addition to the features known from WO 02/47441 (Hu), a second resonant capacitor which has no pump action.

A first resonant capacitor with a pump action and a second resonant capacitor without a pump action provide a degree of freedom with which the properties of the circuit arrangement can be optimized more effectively. The second resonant capacitor according to the invention makes it possible on the one hand to adhere to the relevant regulations and at the same time to minimize component loading. Furthermore, the invention makes it possible to select values for the capacitance of the two resonant capacitors such that they fall within a conventional grid. Inexpensive components can thus be used for the resonant capacitors.

The valley fill circuit is a PFC circuit which does not require any substantial additional component loading. This additional loading affects components such as inductors and electronic switches and is caused by excess currents and voltages which are produced in connection with wattless power transport. However, with a valley fill circuit alone it is not possible to achieve any rated current harmonics which conform to standards. A lamp current crest factor which conforms to standards is also not achieved.

Using a charge pump it is possible to achieve rated current harmonics which conform to standards and a lamp current crest factor which conforms to standards. However, the use of a charge pump brings with it additional component loading. Charge pumps which are connected to the positive rectifier output are conventional.

The combination of a valley fill circuit with a charge pump reduces the rated current harmonics and the lamp current crest factor with only low additional component loading. At a power consumption from the power supply system of over 25 W, the rated current harmonics need to be reduced further still owing to the standards which apply to this power range.

The invention is therefore advantageously developed such that the charge pump is of dual design. That is to say a charge pump is connected both to the positive and to the negative rectifier output. At a power consumption from the power supply system of over 25 W, too, rated current harmonics which conform to standards and a lamp current crest factor which conforms to standards are thus achieved with only low additional component loading.

One particularly advantageous refinement of the invention is characterized in that an inverter is in the form of a half-bridge inverter. The inverter is connected between a positive and a negative busbar and as a result is supplied with a DC voltage. The inverter provides a radiofrequency AC voltage at an inverter output for operating light sources. The design of the inverter as a half-bridge inverter makes it possible to achieve a particularly high efficiency of the circuit arrangement.

A further, particularly advantageous refinement of the invention is characterized in that one connection of the light source is connected to the positive or negative busbar via a coupling capacitor. A further reduction of the rated current harmonics and the lamp current crest factor is thus achieved.

BRIEF DESCRIPTION OF THE DRAWINGS

The present invention will now be explained in more detail using exemplary embodiments with reference to drawings.

In the text below, transistors are indicated by the letter T, diodes by the letter D, capacitors by the letter C, inductors by the letter L, resistors by the letter R and connections by the letter J, in each case followed by a number. In the text below, the same references are also used for identical elements and elements having the same function in all of the various exemplary embodiments.

DETAILED DESCRIPTION OF THE INVENTION

Figure 1:
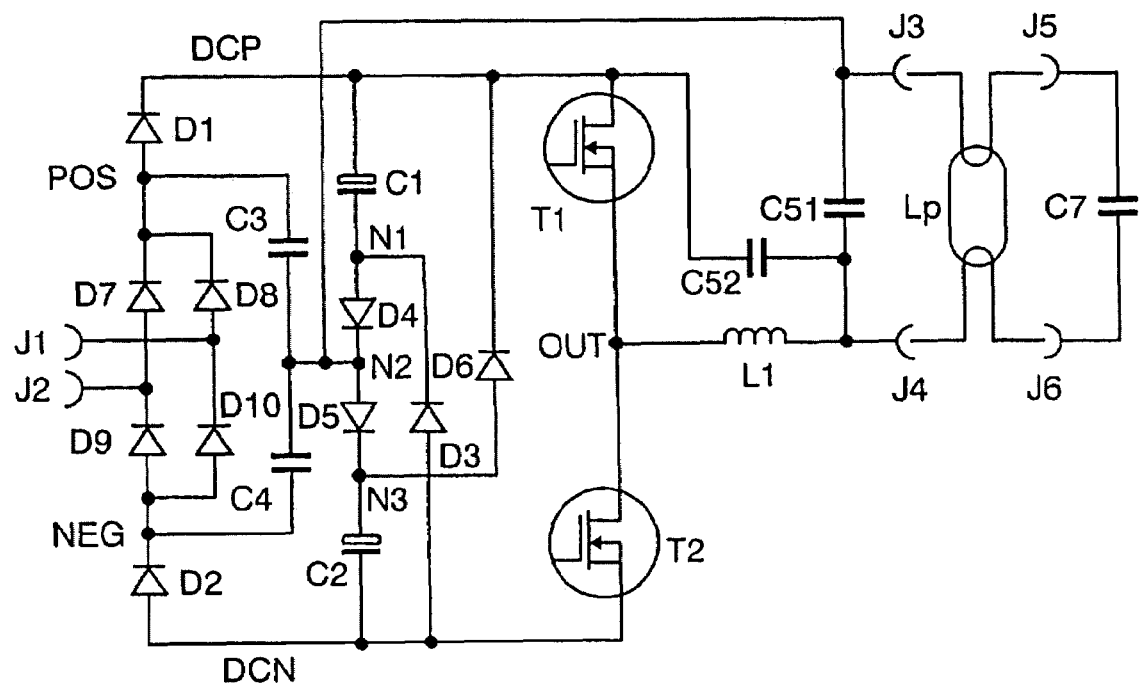
FIG. 1 shows one exemplary embodiment of the invention for a fluorescent lamp having electrode filaments.

FIG. 1 shows one exemplary embodiment of the invention for a fluorescent lamp having electrode filaments. The connections J1 and J2 form the system voltage input. A system voltage can be connected to J1 and J2. J1 and J2 are connected to the input of a rectifier. Means for suppressing radio interference can also be connected upstream of the rectifier.

In general, the rectifier comprises a known bridge circuit comprising the rectifier diodes D7, D8, D9 and D10 which provides the rectified system voltage at its positive rectifier output POS and at its negative rectifier output NEG. Owing to the charge pump it must be possible for the rectifier diodes to switch at a high frequency. It is also possible to use slow rectifier diodes. In this case, however, a fast diode needs to be connected in each case between the bridge circuit and the respective rectifier output.

A first diode D1, which is a pump diode, is connected at its anode to the positive rectifier output POS and at its cathode to a positive busbar DCP.

An optional second diode D2, which is likewise a pump diode, is connected at its cathode to the negative rectifier output NEG and at its anode to a negative busbar DCN. This second diode D2 may be dispensed with if no second pump capacitor C4 (described later) is provided. The second pump capacitor C4 results in a further improvement as regards the rated current harmonics and the lamp current crest factor without any significant component loading.

The series circuit comprising a third D3, a fourth D4, a fifth D5 and a sixth diode D6 is connected between the positive DCP and the negative busbar DCN, in each case the cathodes of these diodes being directed towards the positive busbar DCP, and the connection points of these diodes forming the following nodes: a first node N1 between the third D3 and the fourth diode D4, a second node N2 between the fourth D4 and the fifth diode D5, and a third node N3 between the fifth D5 and the sixth diode D6.

A first storage capacitor C1 is connected between the positive busbar DCP and the first node N1. A second storage capacitor C2 is connected between the negative busbar DCN and the third node N3. The diodes D3, D4, D5 and D6 and the storage capacitors C1 and C2 form the valley fill circuit. It is a modified valley fill circuit as has been mentioned in connection with the abovementioned document U.S. Pat. No. 6,316,883 (Cho). The diodes D4 and D5 form the abovementioned split diode pair. A radiofrequency voltage which is tapped off from a load circuit is applied to the node N2 connected between the diodes D4 and D5. A charge pump thus also operates to a limited extent in the valley fill circuit. A resistor may also be connected in series with the diodes. The rated current harmonics are thus further reduced.

The series circuit comprising two electronic switches T1 and T2 is connected between the positive and the negative busbars DCP and DCN. T1 and T2 form a half-bridge inverter which has an inverter output OUT at the connection point of T1 and T2. The half-bridge inverter draws power via the positive and the negative busbars DCP and DCN. Owing to the alternate switching on and off of T1 and T2, a radiofrequency AC voltage is applied to the inverter output OUT opposite the negative busbar DCN. This output voltage of the inverter has an inverter oscillating frequency which is substantially higher than the system frequency. The negative busbar DCN acts in this case as a reference potential for defining the output voltage of the inverter. Without representing a limitation to universality, the positive busbar DCP may also act as the reference potential.

T1 and T2 are in the form of MOSFETs in the exemplary embodiment. However, other electronic switches may also be used. A control voltage which brings about the alternate switching on and off of T1 and T2 is applied to the gate connections of T1 and T2. This control voltage is provided by a control circuit (not illustrated in FIG. 1). The control circuit may either contain a freely oscillating oscillator or be controlled by the load circuit, as a result of which a self-oscillating half-bridge inverter known from the prior art is formed.

A reactance network is connected to the inverter output OUT and has the main function of matching a source impedance of the inverter output OUT to a load impedance of the light source. In the exemplary embodiment, the reactance network comprises a lamp inductor L1 and a first and a second resonant capacitor C51 and C52. The lamp inductor L1 has a first and a second connection, the first connection being connected to the inverter output OUT.

According to the invention, the second connection of the lamp inductor L1 is connected in each case to a first connection of the first and second resonant capacitors C51, C52, a second connection of the first resonant capacitor C51 being connected to the second node N2, and a second connection of the second resonant capacitor C52 being connected to the positive busbar DCP. With the same effect, the second connection of the second resonant capacitor C52 may also be connected to the negative busbar DCN instead of to the positive one.

As is known, the series resonance of the lamp inductor L1 and the resonant capacitors C51, C52 is important for starting and operating the fluorescent lamp. For this series resonance, the sum of the values of the capacitances C51 and C52 are critical. Given a constant value for the total, in the circuit arrangement according to the invention the individual values for capacitances C51 and C52 can be varied. The value for C51 can be used to adjust the level of operation of the charge pump, whereas the value for C52 has no direct influence on the charge pump.

The two connections of the first resonant capacitor C51 are connected to output terminals J3, J4 to which a light source Lp can be connected. FIG. 1 illustrates by way of example a fluorescent lamp for a light source. The circuit arrangement may in principle, however, also be used for operating other light sources, such as high-pressure discharge lamps, light-emitting diodes or incandescent lamps. In order to operate light-emitting diodes or incandescent lamps a transformer may be provided which matches the output voltage of the inverter to the voltage level required by the light sources. The fluorescent lamp illustrated in FIG. 1 has two electrode filaments. In each case one connection of the electrode filaments is connected to the output terminals J3 and J4. The respective other connection of the electrode filaments is connected to a heating capacitor C7 via further connection terminals J5 and J6. C51 and C7 are thus connected via the electrode filaments. Before the lamp Lp is started, a preheating current thus flows through the electrode filaments, which increases the life of the lamp Lp. The value for C7 must be taken into account when determining the value for C51.

The heating capacitor C7 is not required for the basic function of the invention. It may even be dispensed with. A so-called cold start for the lamp results. The filaments may also be preheated by other means known from the prior art, such as transformers.

The radiofrequency AC voltage which is applied to the node N2 is also applied to a pump capacitor C3 which is connected to the positive rectifier output POS. The connection of the node N2 to the positive rectifier output POS via the pump capacitor C3 realizes a first charge pump.

The pump capacitor C4 is advantageously connected between the nodes N2 and the negative rectifier output NEG. A second charge pump is thus realized at the negative rectifier output NEG. The two pump capacitors preferably have the same value. The advantageous second charge pump makes it possible to reduce the amplitude of the rated current harmonics and the value of the lamp current crest factor without buffer-storing large amounts of wattless power in the pump capacitors C3 and C4. The load on the lamp inductor L1 and the electronic switches T1 and T2 is thus kept low.

Figure 2:
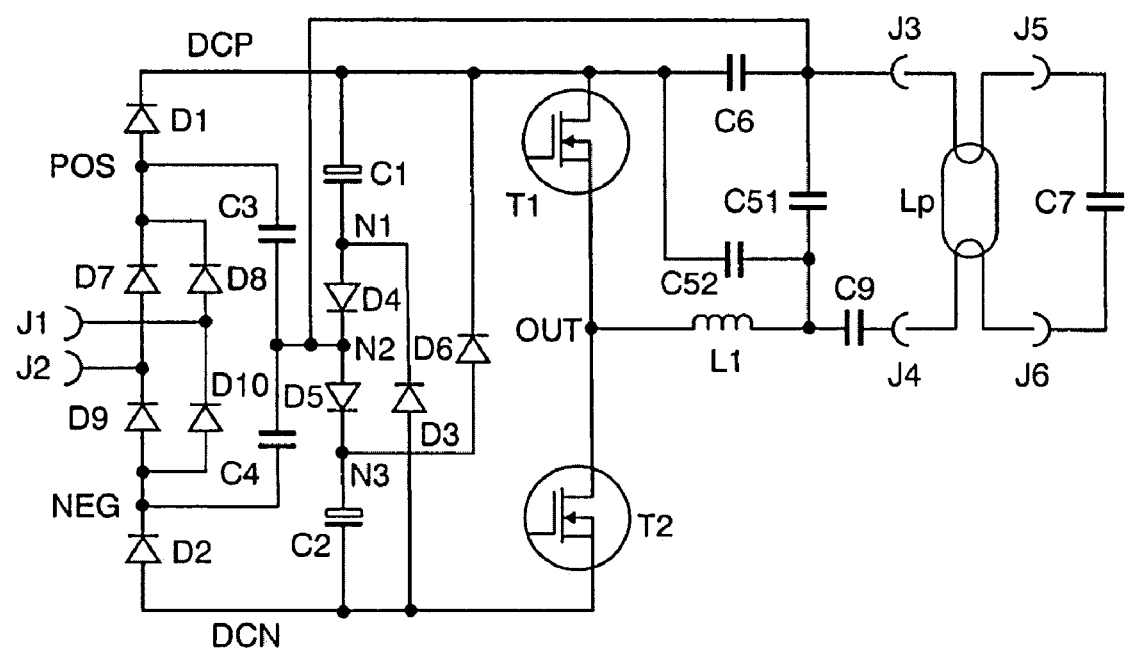
FIG. 2 shows a further exemplary embodiment of the invention for a fluorescent lamp having electrode filaments.

FIG. 2 shows a further exemplary embodiment of the invention. It has proved advantageous if the lamp Lp is connected to the positive or negative busbar DCP or DCN via a coupling capacitor C6. The amplitude of the rated current harmonics and the lamp current crest factor can thus be decreased. The exemplary embodiment in FIG. 2 is a development of that shown in FIG. 1 in that C6 is connected between the second connection of C51 and the positive busbar DCP. C6 is thus also connected between the lamp connection J3 and the positive busbar DCP.

A further difference between FIG. 1 and FIG. 2 lies in the coupling of the lamp Lp. In the exemplary embodiment in FIG. 2, the second connection of the lamp inductor L1 is connected to the connection terminal J4 via a DC capacitor C9. C9 is thus connected in series with the lamp Lp, as a result of which a direct current through the lamp Lp is ruled out. This may be of advantage for the life of the lamp. It is then also possible to use circuits which detect a filament breakage by means of a test current through the filaments.

Figure 3:
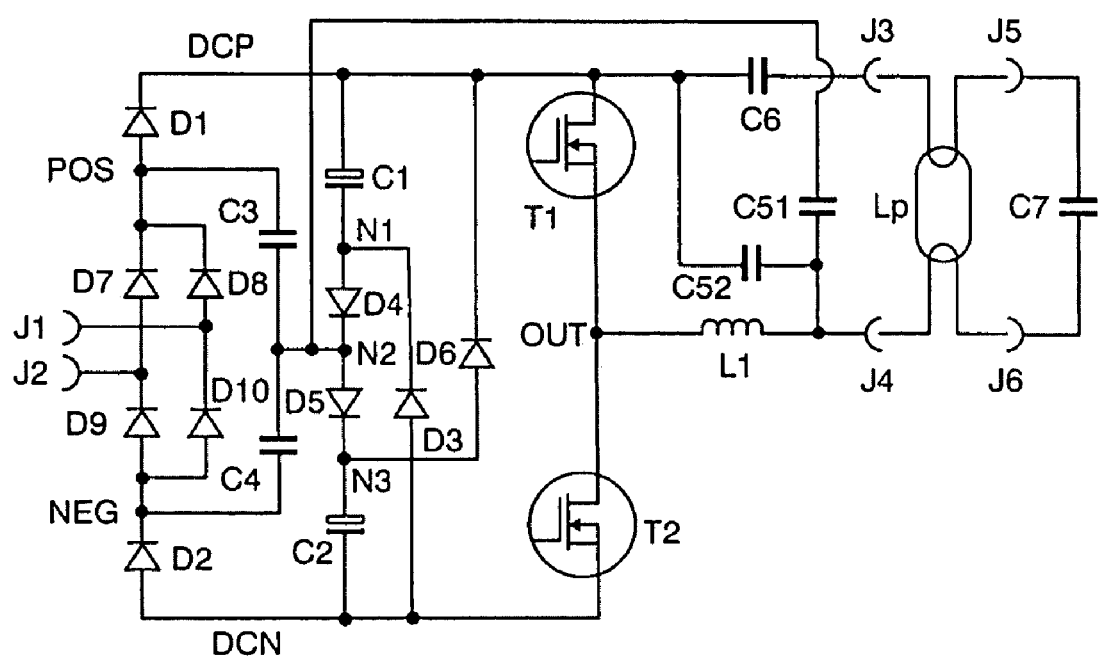
FIG. 3 shows a further exemplary embodiment of the invention for a fluorescent lamp having electrode filaments.

FIG. 3 shows a further exemplary embodiment of the invention for a fluorescent lamp having electrode filaments.

It differs from the exemplary embodiment in FIG. 2 firstly by the DC capacitor being dispensed with again, as in FIG. 1, and being replaced by a bridge. A second substantial difference is the fact that the second connection of the first resonant capacitor C51 is no longer connected to the lamp connection J3 and the coupling capacitor C6. It is thus no longer the radiofrequency AC voltage from J3 that is fed to the second node N2 but the radiofrequency AC voltage from J4, via C51. In this embodiment of the invention it is advantageous that the positive busbar DCP has a smaller radiofrequency AC voltage component. This results in further reduced component loading. In addition, a reduced radiofrequency AC voltage component on the positive busbar DCP has an advantageous effect on radio interference in the circuit arrangement.

Figure 4:
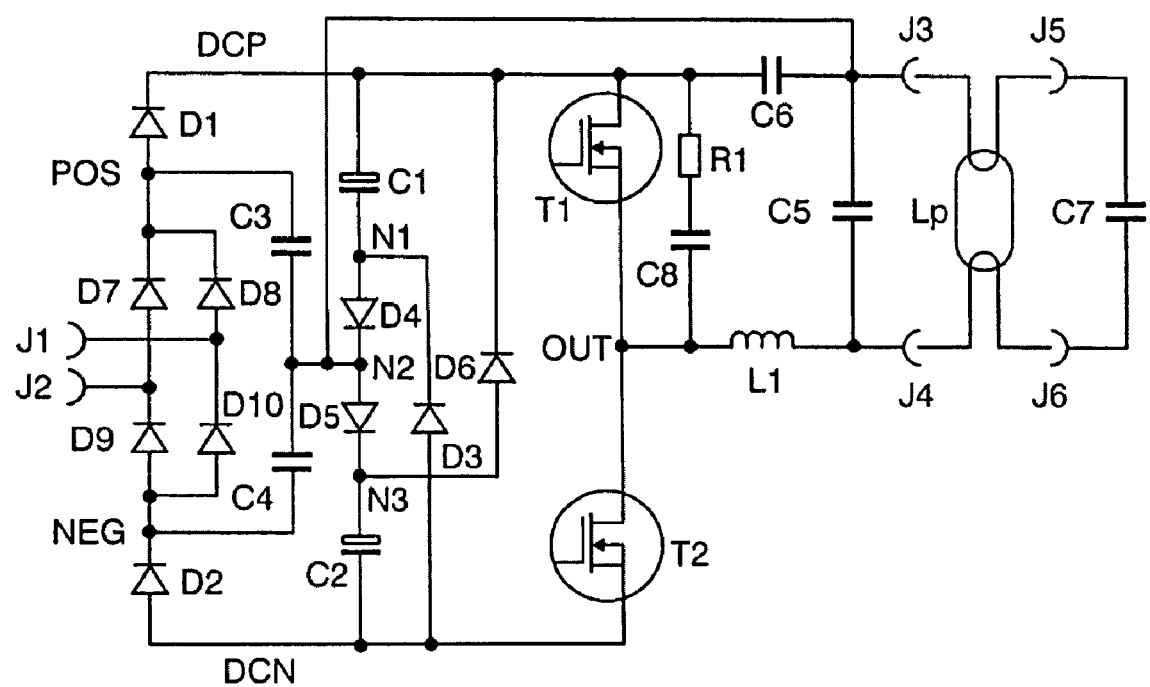
FIG. 4 shows a circuit arrangement having only one resonant capacitor.

FIG. 4 shows a development of the prior art. The circuit arrangement in FIG. 4 does not contain the second resonant capacitor C52 according to the invention. However, it does contain the second charge pump by means of C4 and D2 which is advantageous compared with the prior art. In addition, a so-called snubber is connected in parallel with the electronic switch T1 and comprises, in FIG. 4, the series circuit comprising a resistor R1 and a capacitor C8. Such snubbers are known from the prior art for the purpose of relieving the switching load on the electronic switches and can be combined with the present invention.

Only one lamp Lp is depicted in each of the figures. However, it is also possible for a plurality of lamps to be operated in series or in parallel. The invention is particularly advantageous in the case of a series circuit. This can be explained by the fact that, in the case of a series circuit of lamps, the resulting lamp voltage is higher than in the case of only one lamp, which leads to high component loads without the measures according to the invention.

The radiofrequency AC voltage, which is supplied to the node N2, is drawn from the potential at the connection J3 or J4 in the exemplary embodiments. This corresponds to the potentials at the connections of the resonant capacitor C51. However, the node N2 may also be connected to other potentials which have a radiofrequency AC voltage. For example, the inverter output OUT is suitable for this purpose. The variants selected in the exemplary embodiments have the lowest amplitude for the rated current harmonics and the lowest lamp current crest factor.

The invention claimed is:

1. A circuit arrangement for operating light sources having the following features:
    a rectifier (D7, D8, D9, D10) having a system voltage input (J1, J2) which, when a system AC voltage at a system frequency is applied at its system voltage input, provides a rectified system AC voltage at a positive (POS) and a negative rectifier output (NEG),
    a first diode (D1) which is connected at its anode to the positive rectifier output (POS) and at its cathode to a positive busbar (DCP),
    a negative busbar (DCN) which is connected to the negative rectifier output (NEG),
    a third (D3), a fourth (D4), a fifth (D5) and a sixth diode (D6) which are connected in series between the positive (DCP) and the negative busbar (DCN), in each case the cathode of these diodes (D3, D4, D5, D6) being directed towards the positive busbar (DCP), and the connection points of these diodes (D3, D4, D5, D6) forming the following nodes: a first node (N1) between the third (D3) and the fourth diode (D4), a second node (N2) between the fourth (D4) and the fifth diode (D5), and a third node (N3) between the fifth (D5) and the sixth diode (D6),
    a first (C1) and a second storage capacitor (C2), the first storage capacitor (C1) being connected between the positive busbar (DCP) and the first node (N1), and the second storage capacitor (C2) being connected between the negative busbar (DCN) and the third node (N3),
    an inverter (T1, T2), which is connected to the positive (DCP) and the negative busbars (DCN) for the purpose of supplying power and provides an inverter output voltage at an inverter output (OUT) opposite the negative busbar (DCN), said voltage having an inverter oscillating frequency which is substantially higher than the system frequency,
    a reactance network which is connected to the inverter output (OUT) and provides output terminals (J3, J4) for connecting light sources, the reactance network comprising a lamp inductor (L1) which has a first and a second connection, and the first connection being connected to the inverter output (OUT),
    a coupling between the reactance network and the node (N2) which brings about a voltage waveform at the node (N2) opposite the negative busbar (DCN) which has the inverter oscillating frequency,
    a first pump capacitor (C3) which is connected to the node (N2) and to the positive rectifier output (POS),
    wherein the second connection of the lamp inductor (L1) is connected in each case to a first connection of a first and a second resonant capacitor (C51, C52), a second connection of the first resonant capacitor (C51) being connected to the second node (N2), and a second connection of the second resonant capacitor (C52) being connected to the positive (DCP) or negative (DCN) busbar.

2. The circuit arrangement for operating light sources as claimed in claim 1,
    wherein
    a second diode (D2) is connected between the negative busbar (DCN) and the negative rectifier output (NEG), the cathode of said diode being directed towards the negative rectifier output (NEG), and
    the circuit arrangement has a second pump capacitor (C4), the second pump capacitor (C4) being connected to the node (N2) and to the negative rectifier output (NEG).

3. The circuit arrangement for operating light sources as claimed in claim 1,
wherein
the second connection of the lamp inductor (L1) is connected to a connection terminal for connecting light sources (J4), and the second connection of the first resonant capacitor (C51) is connected to a further connection of light sources (J3).

4. The circuit arrangement for operating light sources as claimed in claim 3,
wherein
the further connection terminal for connecting light sources (J3) is connected to the positive (DCP) or the negative (DCN) busbar via a coupling capacitor (C6).

5. The circuit arrangement for operating light sources as claimed in claim 1,
wherein
the second connection of the lamp inductor (L1) is connected to a connection terminal for connecting light sources (J4), and a further connection terminal for connecting light sources (J3) is connected to the positive (DCP) or the negative (DCN) busbar via a coupling capacitor (C6).

6. The circuit arrangement for operating light sources as claimed in claim 1,
wherein
the second connection of the lamp inductor (L1) is connected to a connection terminal for connecting light sources (J4) via a DC capacitor (C9).

7. The circuit arrangement for operating light sources as claimed in claim 1,
wherein
the light source (Lp) is a gas discharge lamp.

8. The circuit arrangement for operating light sources as claimed in claim 1,
wherein
the light source (Lp) is a gas discharge lamp having heatable filaments, in each case one connection of a filament being connected to an output terminal of the reactance network (J3, J4), and the respective other connections of the filaments being connected via a heating capacitor (C7) when the gas discharge lamp is connected.

9. The circuit arrangement for operating light sources as claimed in claim 1,
wherein
the inverter is a half-bridge inverter which comprises a series circuit comprising two electronic switches (T1, T2) which are connected between the positive (DCP) and the negative busbars (DCN), and the inverter output (OUT) is the connection point of the two electronic switches (T1, T2).

* * * * *